United States Patent [19]

Connell et al.

[11] 4,255,641
[45] Mar. 10, 1981

[54] METHOD OF OUTSIDE WELDING OF PIPELINES

[75] Inventors: Talbert D. Connell, Conroe; Eugene F. Sims, Houston, both of Tex.

[73] Assignee: Crutcher Resources Corporation, Houston, Tex.

[21] Appl. No.: 903,398

[22] Filed: May 8, 1978

[51] Int. Cl.$^3$ .............................................. B23K 31/06
[52] U.S. Cl. ..................................... 219/61; 219/59.1; 219/137 R; 228/166; 228/168; 228/169
[58] Field of Search ............... 228/151, 168, 169, 166; 219/61.11, 61, 59.1, 60 A, 137 R

[56] References Cited

U.S. PATENT DOCUMENTS

| | | | |
|---|---|---|---|
| 1,665,851 | 4/1928 | Harris | 219/59.1 |
| 2,662,277 | 12/1953 | Stone | |
| 3,047,942 | 8/1962 | Schneider | |
| 3,209,122 | 9/1965 | Johnston | 219/61 X |
| 3,922,517 | 11/1975 | Nezson | 219/137 R |

OTHER PUBLICATIONS

Welding Handbook "Welding Processes", Sixth Edition Section Two Aws., N.Y. 1969, pp. 11-15, Appendix.

Primary Examiner—E. A. Goldberg
Attorney, Agent, or Firm—Richards, Harris and Medlock

[57] ABSTRACT

The specification discloses a method and apparatus for assuring the integrity of outside weldings of pipelines. Pipe sections are prepared for welding by forming a beveled profile with a relatively narrow annular contact band on the ends of each pipe section. When the pipe sections are abutted end to end for welding, the leveled profiles form a relatively deep groove on the outside of the pipe between the pipe sections, with the annular contact bands abutting and spaced inwardly from the grooves. The contact band on at least one of the pipe sections is circumferentially prepared such as by knurling to provide controlled spacing between the contact bands of the pipe sections. A welding arc is applied to the bottom of the groove from the exterior of the pipe sections to weld the annular contact bands together. Welding penetration is enhanced by the circumferential preparation of the contact bands.

6 Claims, 10 Drawing Figures

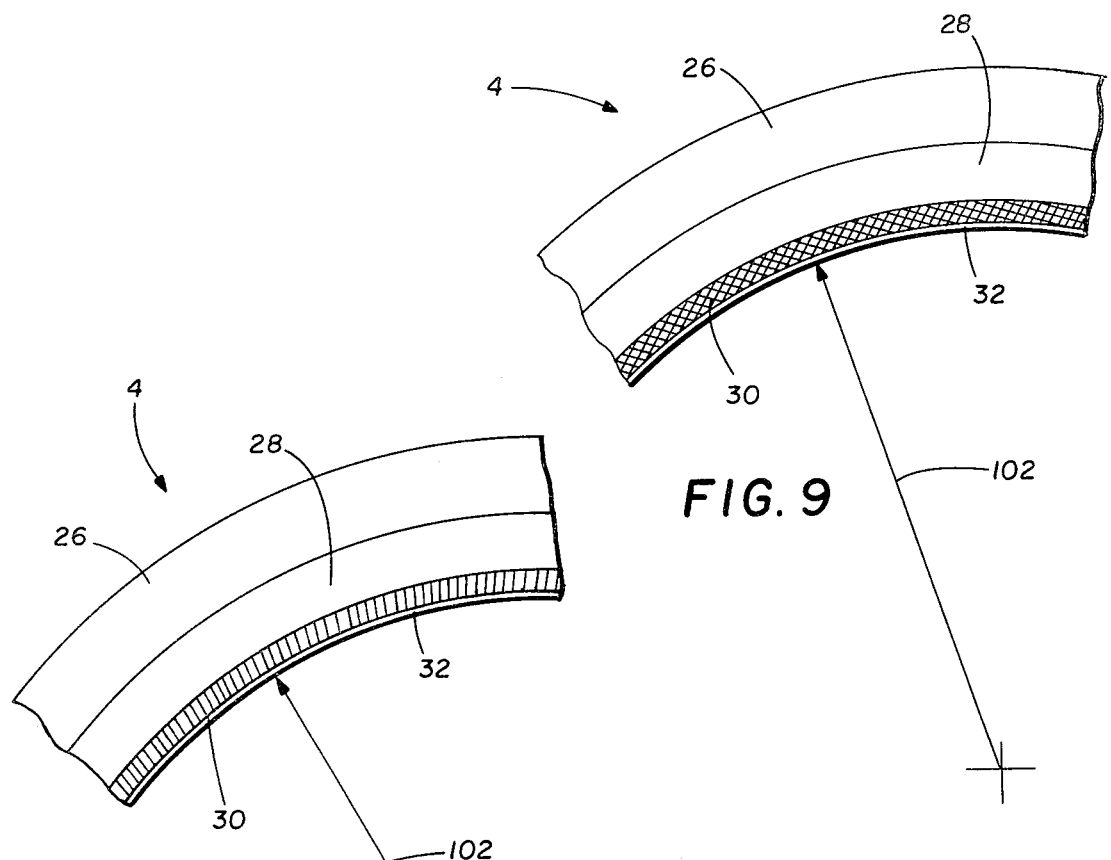
FIG. 9
FIG. 8
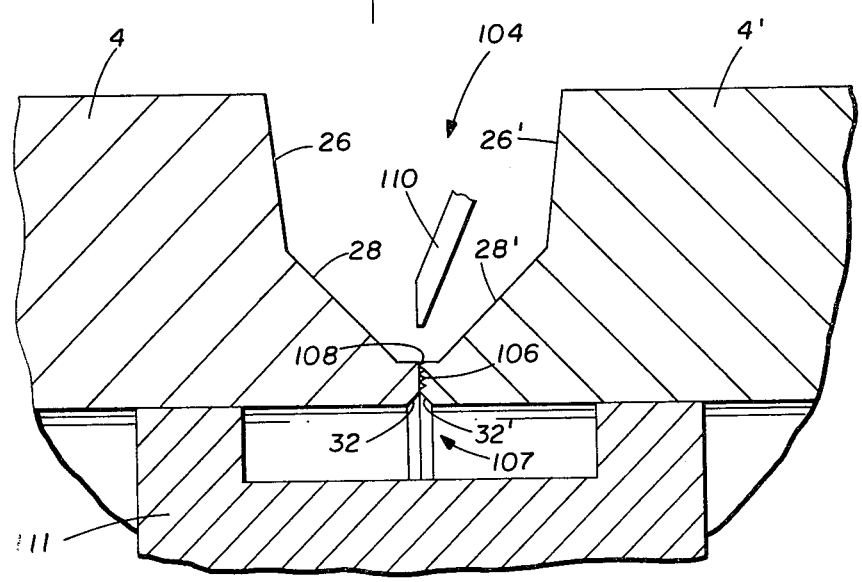
FIG. 10

METHOD OF OUTSIDE WELDING OF PIPELINES

FIELD OF THE INVENTION

The present invention relates to pipeline welding and particularly relates to circumferential preparation of pipe sections ends to enhance welding penetration.

BACKGROUND AND PRIOR ART

Product carrying pipelines such as used for oil, gas, chemical and other liquid state transmission are installed by welding end to end multiple sections of steel pipe. Welding operations have heretofore been performed automatically as disclosed in U.S. Pat. No. 3,461,264 to Nelson et al. Previous to the availability of automatic welders, such pipes had been welded using hand methods of electrical or acetylene welding procedures.

In achieving high quality work, it has been found to be extremely advantageous to utilize automatic arc welding techniques such as disclosed in said Nelson et al, U.S. Pat. No. 3,461,264. In accordance with such techniques, the confronting ends of two pipe sections that are to be joined are suitably shaped so that when the pipe sections are brought into contact, one with another, there is formed a relatively narrow inside groove, a shallow contact band or land concentrically spaced outwardly from the inner groove, and a relatively deep outer groove. The operation had been to initially join the pipe sections together by a weld pass on the inside of the pipe to fill the inside shallow groove with weld metal. Thereafter, external welding procedures are employed using systems such as shown in U.S. Pat. No. 3,806,694 to Nelson et al. By this means, the outer groove is filled and the weld is completed.

In order to avoid the necessity for the initial inside welding pass and the attendant difficulties in operating and maintaining automatic equipment to achieve such inside welding operations, attempts have been made to achieve satisfactory welds with operations wholly outside the pipe. In connection with such attempts, backup pads have been utilized which, when placed inside the pipe, contact the inner surface of the two pipe sections at the site of the joint, thereby aiding in controlling the welding operation as it proceeds from an outside unit. Even with backup pads, however, the viscous weld metal has tended to flow downwardly under gravity as the welder circumscribed the joint. In such attempts, there has remained the persistent problem of achieving uniformity of the weld and heretofore wholly successful outside welding operations have not been uniformly achieved.

SUMMARY OF INVENTION

In accordance with the present invention, a high quality, substantially uniform weld is provided to join the ends of abutting pipe sections by profiling the abutting ends of the pipe sections to define a relatively deep outside groove, with relatively narrow annular contact bands abutting together and concentrically spaced inwardly from or beneath the groove. The present invention further involves circumferentially preparing portions of at least one of the contact bands for providing a controlled spacing between the body material of the sections in the region of the contact bands. Thereafter a welding arc is applied from the outside of the pipe sections to the bottom of the groove above the abutting contact bands. Welding penetration between the abutting contact bands is enhanced by the circumferential preparation of at least one contact band to provide controlled spacing. The phrase 'welding penetration' refers to the penetration of weld metal into a joint during welding as commonly understood in the art. The pipe sections are welded together during an initial pass of the arc at the zone of contact between the contact bands, and thereafter, the groove is welded full. Thus, a high quality uniform weld is provided between the pipe sections without welding from the inside of the pipeline.

In accordance with a particular aspect of the present invention, at least one of the pipe section ends is knurled to form knurling grooves along the contact band. The knurling grooves may form a line pattern inclined at an angle or parallel to the radius of the pipe section, or the knurling grooves may form other patterns such as a criss-cross or diamond pattern on the contact band. If both ends of two abutting pipe sections are knurled, a knurling pattern is chosen that will not align or interface.

BRIEF DESCRIPTION OF THE DRAWING

The advantages and further aspects of the present invention will be readily appreciated by those of ordinary skill in the art by reference to the following Detailed Description when taken in consideration with the accompanying Drawings, in which:

FIG. 8 is an elevational view of a pipe section end that has been knurled with a line pattern;

FIG. 9 is an elevational view of a pipe section end that has been knurled with a diamond pattern; and FIG. 10 is a side cross-sectional view of two abutting pipe section ends being welded in accordance with the present invention.

DETAILED DESCRIPTION

Figure 1:
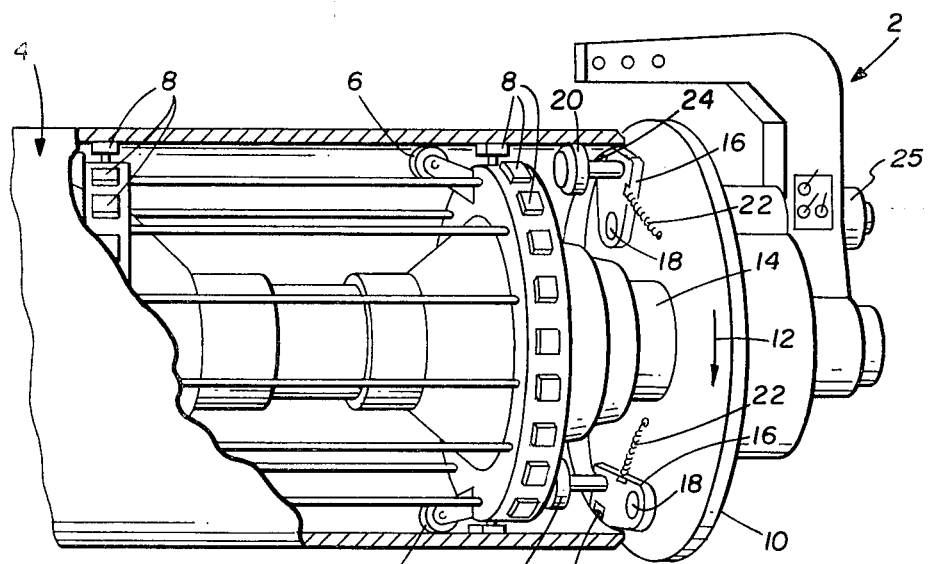
FIG. 1 is a partially cutaway view of a pipe section end preparation machine embodying the present invention.

Referring now to the drawings, in which like reference characters designate like or corresponding parts throughout the several views, there is shown in FIG. 1 a pipe section end preparation machine 2 embodying the present invention. A pipe section 4 is shown broken away for clarity of illustration to show the end preparation machine 2 mounted in position for preparing the end of the pipe section 4. This end preparation machine 2 is constructed substantially as described in U.S. Pat. No. 3,733,939 to Paysinger et al. Rollers 6 and mounting pads 8 fit within the pipe section 4, and mounting pads 8 are urged outwardly to fixedly secure the machine 2 within the pipe section 4. A rotary tool carrier disc 10 is mounted to rotate through a plane substantially parallel to the end of pipe section 4 in the direction indicated by arrow 12. Disc 10 may also be moved towards and away from the end of the pipe section 4.

A plurality of follower arms 16 are pivotally mounted on the disc 10 by pins 18. Roller assemblies 20 extend from arms 16 away from the disc 10 for engaging the inside of the pipe section 4. Springs 22 are attached between the disc 10 and the follower arms 16 to urge the follower arms 16 in an outward direction, so that the roller assemblies 20 will firmly engage the interior of pipe section 4. In this manner, the roller assembly 20 and the follower arm 16 will yieldably follow the end of pipe section 4 as the disc 10 rotates.

End preparation tools 24 are mounted on the follower arm 16 and oriented to engage the end of pipe section 4. As the disc 10 rotates, the end preparation tools 24 follow the end of pipe section 4 in unison with the follower arm 16 and prepare the end of pipe section 4 for welding. The disc 10 is driven by a suitable motor 25 to rotate the end preparation tool 24 and to force the tool 24 against the end of pipe section 4.

In the present invention, the end preparation tool 24 is preferably a knurling tool for uniformly upsetting the end of pipe section 4. The end preparation tool 24 rotates with disc 10 while engaging and uniformly upsetting the end of pipe section 4. In the preferred embodiment, the pipe section 4 is knurled with a line pattern. It will be understood that prior to knurling the end of pipe section 4, a beveled profile may be cut in pipe section 4 such as described, for example, in U.S. Pat. No. 3,922,517 to Nelson et al.

Figure 2:
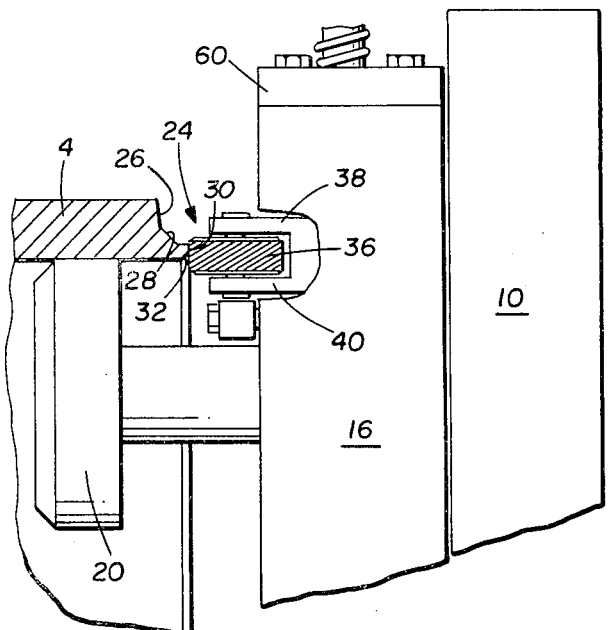
FIG. 2 is a detailed view of the pipe section end preparation machine showing a knurling wheel.

Referring now to FIG. 2, there is shown a detailed view of the end of pipe section 4 and the end preparation tool 24. Prior to the use of end preparation tool 24, the end of pipe section 4 has been tooled to form outer beveled surfaces 26 and 28 and a relatively narrow contact band 30 on the end of pipe section 4. Also, a relatively small inner beveled surface 32 is formed on the end of pipe section 4 inside the contact band 30. The surfaces 26 and 28 form one side of a relatively deep groove when pipe section 4 is abutted with a like pipe section. Beveled surface 32 forms one side of a relatively shallow interior groove when like pipe sections are abutted.

The follower arm 16 is shown in FIG. 2 broken away to reveal the end preparation tool 24 in more detail. Preparation tool 24 includes a knurling wheel 36 rotably mounted on two support arms 38 and 40. As disc 10 rotates, the knurling wheel 36 is forced against the pipe section 4 to roll against and knurl the contact band 30. The follower arm 16 and roller assembly 20 operate to follow the end of pipe section 4 maintaining knurling wheel 36 in engagement with contact band 30 despite irregularities or deformities that may be encountered in pipe section 4. It is permissible for the knurling wheel 36 to travel several turns about the end of pipe section 4. After the first turn, the knurling wheel 36 will track its previous path to deepen or enlarge the grooves formed in the contact band 30. It will be understood that knurling wheel 36 may include any suitable knurling pattern which provides the advantages of the present invention.

Referring now to FIGS. 1 and 2, it will be understood that although two follower arms 16, roller assemblies 20 and end preparation tools 24 are shown, a greater or smaller number of such devices may be mounted on disc 10 for knurling the contact band 30. However, in the preferred embodiment, only one knurling wheel 36 is employed mounted on one follower arm 16.

Figure 3:
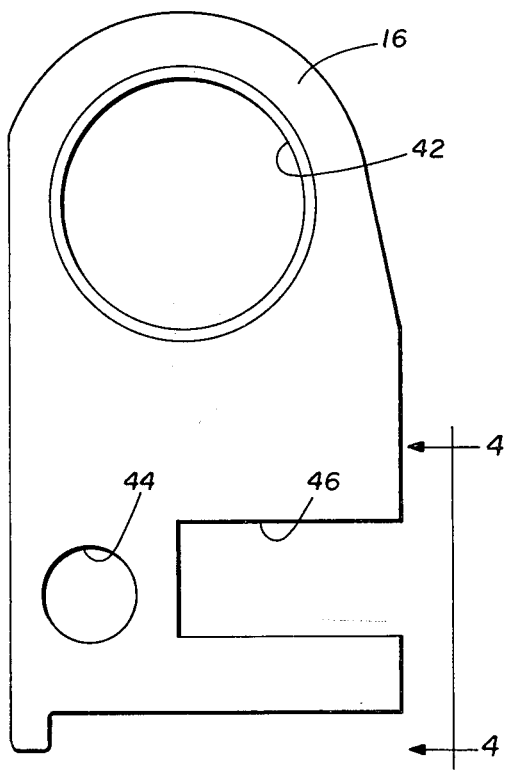
FIG. 3 is a detailed view of a follower arm on which the end preparation tools are mounted.

Referring now to FIG. 3, there is shown a detailed view of a single follower arm 16. A bore 42 is formed in one end of the follower arm 16 for mounting the follower arm on the disc 10. Thus, the bore 42 is dimensioned to mount on the pin 18 shown in FIG. 1. On the other end of follower arm 16, a bore 44 is formed for mounting the roller assembly 20, shown in FIG. 2 on the follower arm. A substantially rectangular slot 46 is formed on the follower arm 16 adjacent the bore 44 and is designed for mounting the preparation tool 24, as will be hereinafter described in more detail.

Figure 4:
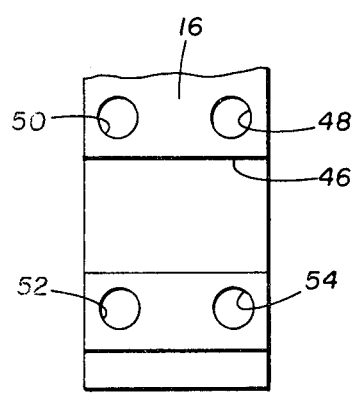
FIG. 4 is a detailed view taken along line 4—4 in FIG. 3.

Referring now to FIG. 4, a partial side view of follower arm 16 is shown taken generally along the line 4—4 in FIG. 3. In this view, four threaded bores 48, 50, 52 and 54 are formed outside of slot 46, two of such bores being disposed on either side of the slot. As will be hereinafter described in more detail, bores 48, 50, 52, and 54 are used in mounting the preparation tool 24 on the follower arm 16.

Figure 5:
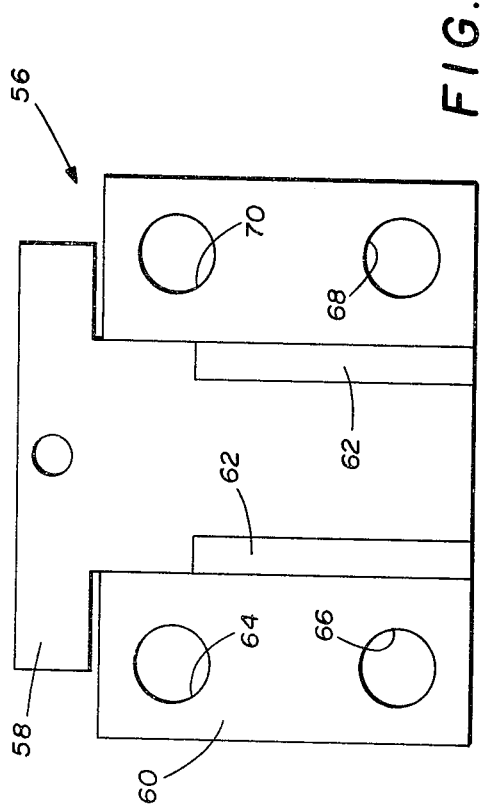
FIG. 5 is a front view of a knurling tool holder for being mounted in the follower arm.
Figure 6:
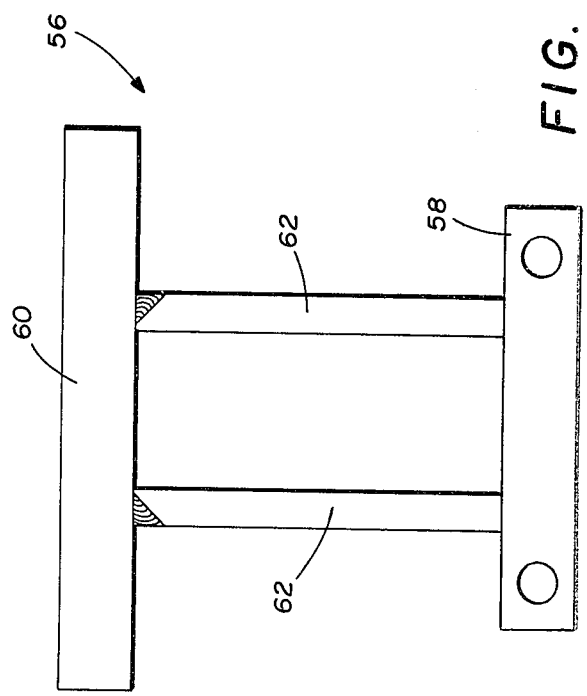
FIG. 6 is a top view of the knurling tool holder.

Referring now to FIGS. 5 and 6, there are shown a front and top view of a tool holder 56, respectively. The tool holder 56 includes two upstanding plate members 58 and 60 extending upwardly from opposite ends of transverse frame members 62. Plate member 60 includes four holes 64, 66, 68 and 70 that are used for mounting the tool holder 56 on the follower arm 16.

Referring now to FIGS. 3, 4, 5 and 6, the tool holder 56 is mounted on the follower arm 16 by inserting a portion of plate member 58 and frame members 62 into the slot 46. Plate member 60 is positioned such that the holes 64, 66, 68 and 70 fit over the threaded bores 48, 50, 52, and 54, respectively, in the follower arm 16, and bolts are inserted through the holes in plate member 60 and threadedly secured in the bores in follower arm 16 to fasten the tool holder 56 on the follower arm 16.

Figure 7:
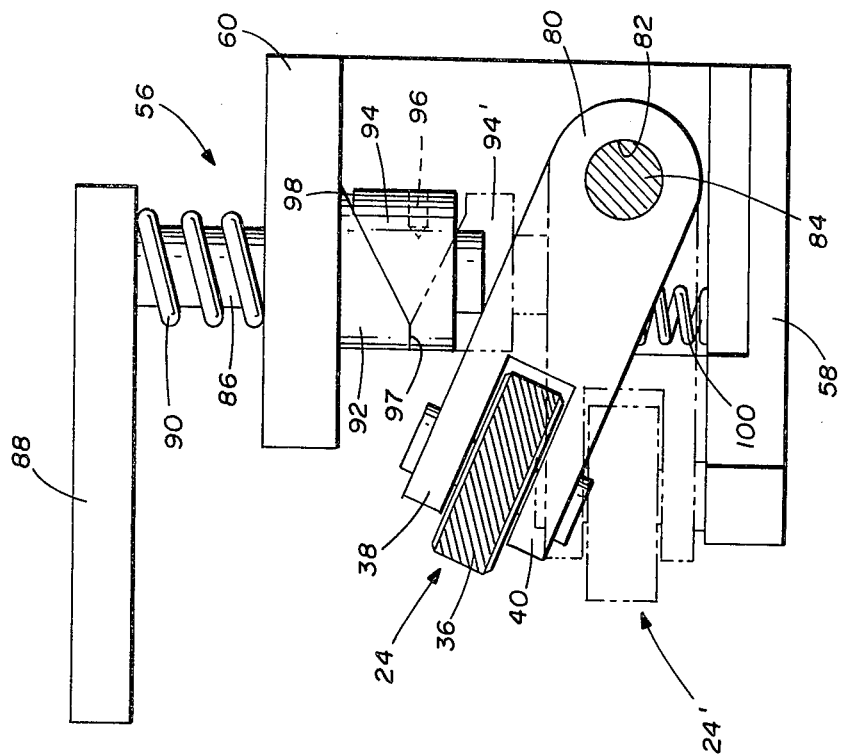
FIG. 7 is a side view of the knurling tool holder with a frame member removed showing a knurling tool mounted therein.

Referring now to FIG. 7, a side view of tool holder 56 is shown with the preparation tool 24 mounted thereon and with one of the transverse frame members 62 removed for clarity of illustration. Preparation tool 24 includes a base 80 having a bore 82 mounted on a shaft 84. The preparation tool 24 may rotate about shaft 84 between a disengaged position as shown in FIG. 7 and engaged position shown in phantom lines in FIG. 7.

A shaft 86 is rotably mounted through plate member 60 of tool holder 56 and includes a lever arm 88 extending from the outer end of the shaft 86. A coil spring 90 encompasses the shaft 86 and biases the lever arm 88 away from the tool holder 56. A wedge shaped cylinder 92 encompasses shaft 86 and is welded to plate 60 on the side opposite from lever arm 88. A second wedge shaped cylinder 94 encompasses shaft 86 and is attached thereto by a set screw 96. Each of the wedge shaped cylinders 92 and 94 include a flat portion 97 and 98, respectively.

To move the preparation tool 24 from the disengaged position to the engaged position, shaft 86 is rotated by means of lever arm 88. The wedge shaped cylinder 94 rotates with the shaft 86 and slides against the stationery wedged shape cylinder 92 and the interaction between cylinders 94 and 92 forces the shaft 86 axially for sliding motion towards and against the preparation tool 24. Cylinder 94 is rotated until the flat portion 98 of cylinder 94 engages the flat portion 97 of cylinder 92 as shown by phantom cylinder 94'. At this point, the shaft 86 has forced the preparation tool 24 into the engaged position shown by phantom lines 24' in FIG. 7. The engagement of flat portion 98 with flat portion 97 will resist the force of coil spring 90 and will prevent the shaft 86 and the preparation tool 24 from returning to the disengaged position.

To move the preparation tool 24 from the engaged position to the disengaged position, lever arm 88 is rotated in the opposite direction until cylinders 94 and 92 are again in the position shown in FIG. 7. As cylinder 94 slides down cylinder 92, shaft 86 moves away from preparation tool 24. A spring 100 operates between plate member 58 and preparation tool 24 to urge tool 24 to follow the shaft 86 as it is retracted, thus, spring 100 will force the tool 24 back into the disengaged position.

The ability to rotate the preparation tool 24 between an engaged and disengaged position allows the tool 24 to be mounted on the disc 10 with other tools such as a cutting tool. While the cutting tools are shaping a profile on the end of pipe section 4, the preparation tool 24 is placed in the disengaged position. After the end of pipe section 4 has been profiled, disc 10 is retracted away from the pipe section 4 and the preparation tool 24 is actuated into the engaged position. Then the disc 10 is moved back towards the pipe section 4 and rotated to knurl the end of pipe section 4.

Referring now to FIG. 8, there is shown a somewhat diagrammatic broken away view of the end of one embodiment of a pipe section 4. In this view, it may be appreciated that beveled surfaces 26 and 28 and the contact band 30 are concentrically positioned. For clarity of illustration, band 30 is slightly exaggerated in size. In FIG. 8, the contact band 30 has been knurled with a line pattern inclined at a constant angle with respect to the radius 102 of the pipe section 4. In a preferred embodiment, a 10 or 12 pitch roller knurling wheel 36 is used to form line grooves on the contact band 30 at an angle of approximately 10° with respect to the radius 102. Typically, the knurled lines on contact band 30 will have a depth in the range of about 0.025 inches. However, it will be understood that many different types of roller knurling wheels may be suitably used in the present invention to provide different knurling patterns.

Referring now to FIG. 9, there is shown a view of another embodiment of the end of a pipe section 4 showing the concentrically positioned beveled surfaces 26 and 28 and the contact band 30. In FIG. 9, a diamond knurl pattern has been impressed on contact band 30. This diamond pattern may be provided by knurling on contact band 30 two line patterns which are inclined at different angles to one another. To impress or form this pattern, two knurling wheels 36 may be mounted on one preparation tool 24, or the second knurling wheel may be mounted on a separate preparation tool and a separate follower arm.

Referring now to FIG. 10, there is shown two pipe sections 4 and 4' abutting end to end, with a relatively deep groove 104 formed between the pipe sections by the beveled surfaces 26, 26', 28' and 28 of each pipe section. Pipe section 4' is knurled on one end to form a knurled annular contact band 106, while the other pipe section 4 has a smooth annular contact band 108. A small interior groove 107 is formed by the inward beveled surfaces 32 and 32' of the pipe sections 4 and 4'. A backup pad 111 is positioned within the pipe sections 4 inwardly from the groove 104. The construction and use of backup pad 111 is described in detail in a patent application entitled, "Weld Backup Padding", filed Apr. 3, 1978, invented by Talbert D. Connell, and assigned to Crutcher Resources Corporation.

In accordance with the invention, an arc welder tip 110 is moved progressively and circumferentially about the contact bands 106 and 108, applying a welding arc to the bottom of groove 104 to weld the bands 106 and 108 together during the initial pass of the welder tip 110. The knurlings on contact band 106 enable and enhance the penetration of the metal to the areas between the contact bands to provide a high quality, uniform, weld without welding the pipe sections 4 from the inside of the pipe sections.

Although pipe sections 4 are shown in FIG. 4 with one contact band 106 being knurled and the other abutting contact band 108 being smooth, it is to be understood that, if desired, both contact bands 106 and 108 may be knurled, and in such case, a knurling pattern should be chosen that will not mesh with the pattern on the opposite contact band, so that there are open areas to enhance the welding penetration between the opposing contact bands. For example, if a line pattern is chosen as shown in FIG. 8, the lines on each abutting pipe sections 4 should be inclined in opposite directions or at different angles. Thus, the lines shown in FIG. 8 may be inclined at positive ten degrees on one pipe section 4 and negative ten degrees on the other abutting pipe section 4'.

Although particular embodiments of the present invention have been described in the foregoing detailed description, it will be understood that the invention is capable of numerous rearrangements, modifications and substitutions of parts without departing from the spirit of the invention.

What is claimed is:

1. In a method of welding together pipe sections in end-to-end relationship of the type involving the steps of beveling the edges of the ends of the pipe sections to form contact bands having flat annular faces, positioning the pipe sections end-to-end with the annular faces of the respective contact bands in abutment to form circumferential inside and outside grooves, applying a welding arc to the bottom of the outside groove, and advancing the welding arc along the outside groove to deposit weld metal therein and form a welded girth joint between the pipe sections, the improvement comprising:

before the step of positioning the pipe sections end-to-end, knurling the annular face of the contact band of at least one of the pipe sections to enhance weld penetration from the outside groove to the inside groove and thereby eliminate provision of an initial welding pass about the inside groove.

2. A method of forming a welded joint between two pipe sections, comprising the steps of:
(a) beveling the outside edges of the ends of the pipe sections to form thereon circular contact bands each having a flat annular face;
(b) knurling the annular face on the contact band of at least one of said pipe sections such that the body material of said one pipe section is located a predetermined distance inward from the tip of said contact band;
(c) positioning the pipe sections end-to-end with the annular faces of the contact bands thereof in abutment to form a circumferential outside groove therebetween;
(d) applying a welding arc to the bottom of the outside groove at the junction of the abutting contact bands; and (e) advancing the welding arc along the outside groove to join the pipe sections at the junction of the contact bands with weld material during the initial welding pass, and to substantially fill the outside groove with weld material during subsequent welding passes and thereby form a girth joint between the pipe sections.

3. The method of claim 2, where in step (b) the annular faces of the contact bands of both of said pipe sections are knurled such that said faces do not mesh upon abutment of said contact bands.

4. The method of claim 2, where in step (b) a plurality of spaced apart non-radial grooves of predetermined depth are formed across the annular face of said contact band.

5. The method of claim 2, where in step (b) two sets of spaced apart non-radial grooves of predetermined depth are formed in the annular face of said contact band in criss-cross fashion.

6. A method of welding together pipe sections end-to-end from the outside thereof without an initial inside welding pass, comprising the steps of:

(a) beveling the inside and outside edges of the ends of said pipe sections to form thereon circular contact bands having flat annular faces;

(b) forming a plurality of spaced apart non-radial grooves of predetermined depth into the annular face on the contact band of one pipe section such that the body material of said one pipe section is located inward from the tip of said contact band;

(c) positioning the pipe sections end-to-end with the annular faces of the contact bands thereof in abutment to form circumferential inside and outside grooves therebetween;

(d) applying a welding arc to the bottom of the outside groove at the junction of the abutting contact bands;

(e) advancing the welding arc along the outside groove to weld the pipe sections at the contact bands with an initial outside welding pass; and (f) continuing advancement of the welding arc along the outside groove to substantially fill said groove with weld material during subsequent welding passes to provide a complete girth joint between the pipe sections.

* * * * *